No. 893,070. PATENTED JULY 14, 1908.
E. GOBBI.
APPARATUS FOR FILTERING LIQUIDS AND FLUIDS.
APPLICATION FILED JAN. 8, 1906.
3 SHEETS—SHEET 1.
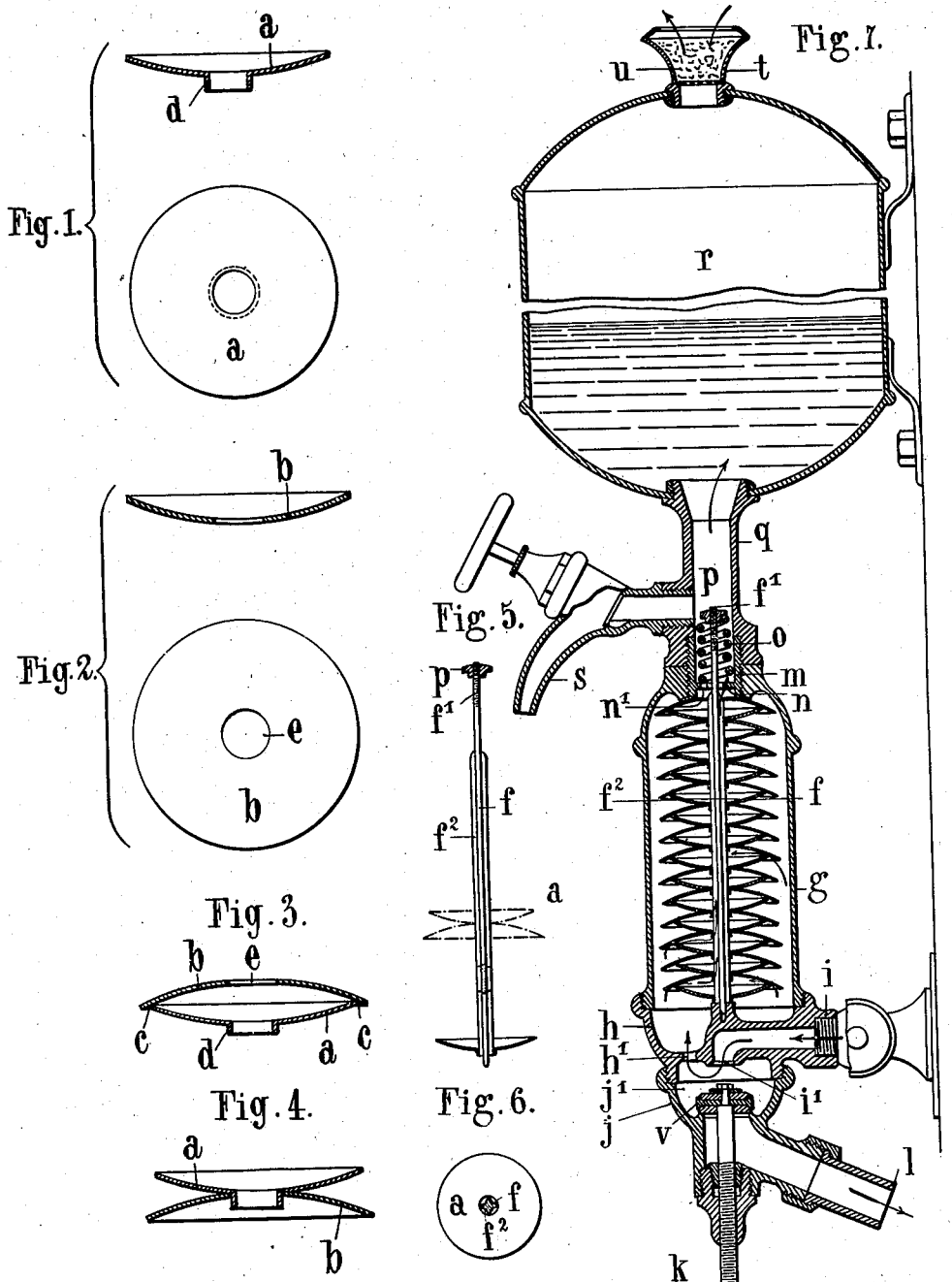

No. 893,070. PATENTED JULY 14, 1908.
E. GOBBI.
APPARATUS FOR FILTERING LIQUIDS AND FLUIDS.
APPLICATION FILED JAN. 8, 1906.
3 SHEETS—SHEET 2.
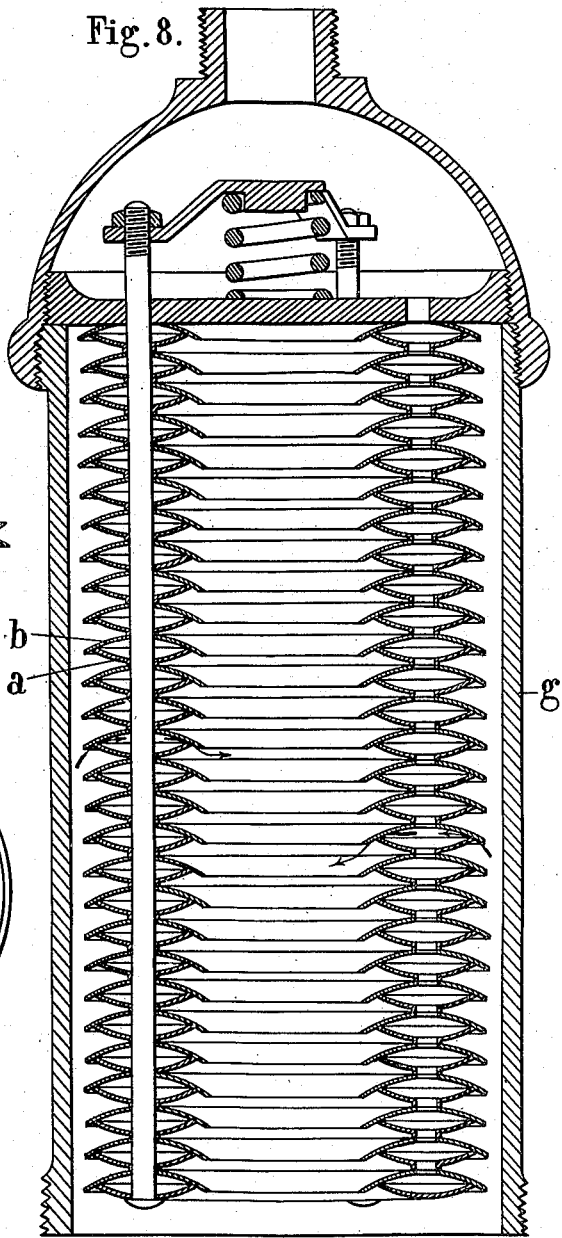
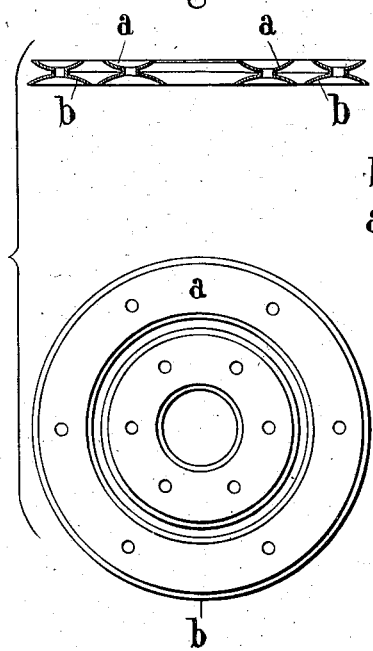
WITNESSES:
G. V. Rasmussen
John A. Stellenbeck.
INVENTOR
Emile Gobbi
BY
Bierend Knauth
ATTORNEYS No. 893,070. PATENTED JULY 14, 1908.
E. GOBBI.
APPARATUS FOR FILTERING LIQUIDS AND FLUIDS.
APPLICATION FILED JAN. 8, 1906.

3 SHEETS—SHEET 3.

WITNESSES:
G. V. Rasmussen
John A. Stehlenbeck

INVENTOR
Emile Gobbi
BY
Briesen Knauth
ATTORNEYS

UNITED STATES PATENT OFFICE.

EMILE GOBBI, OF PARIS, FRANCE.

APPARATUS FOR FILTERING LIQUIDS AND FLUIDS.

No. 893,070.　　　　Specification of Letters Patent.　　　Patented July 14, 1908.

Application filed January 8, 1906. Serial No. 295,039.

*To all whom it may concern:*

Be it known that I, EMILE GOBBI, of 45 Rue Jacob, in the city of Paris, Republic of France, engineer, have invented Improvements in Apparatus for Filtering Liquids and Fluids, of which the following is a full, clear, and exact description.

This invention relates to apparatus for the filtering of liquids or fluids constituted by a number of superposed non-permeable members between which the liquid, which for example it may be desired to filter passes. To this end the aforesaid members present juxtaposed surfaces held more or less in intimate contact with one another by means capable of being adjusted according to whether it be desired to regulate the degree of filtration or the flow of the liquid or fluid, or to facilitate the return flow of the filtered liquid, when it is desired to cleanse the filtering members and the remainder of the apparatus of which they form a part. The aforesaid members may be arranged so as to filter liquids passing from without to within or vice versa.

Figure 10:
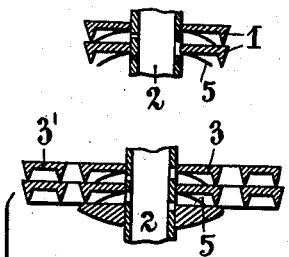
Figure 11:
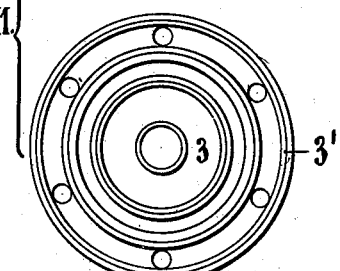
Figure 12:
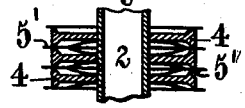
Figure 13:
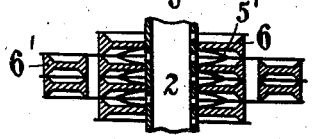
Figure 14:
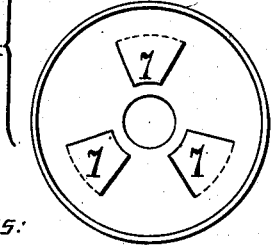

The invention will be described with reference to the accompanying drawings wherein:

Figures 1 and 2 show in cross section and plan two halves of a filtering member in the first stage of manufacture and Figs. 3 and 4 show similar halves placed together. Fig. 5 is an elevation, and Fig. 6 a horizontal section of a central rod which carries the aforesaid filtering members. Fig. 7 is a vertical section of one arrangement of filter constructed according to this invention, and Fig. 8 is a modified form thereof provided with a receiver. Fig. 9 shows in cross section and in plan a modified form of filtering member. Fig. 10 is a vertical section showing another form of filtering member embodying my invention; Fig. 11 shows still another form in vertical section and in plan view; Fig. 12 is a vertical section of another form of filtering member; Fig. 13 is a vertical section of still another form; and Fig. 14 shows a further form of construction in vertical section and in plan view.

As is shown in the drawings the filtering apparatus consists essentially of non-permeable members presenting juxtaposed surfaces designed so as to enable them to be superimposed more or less in intimate contact one upon another by a method of fixing specially adapted for this purpose.

According to the arrangement shown in the drawings, Figs. 1, 2, 3 and 4, the filtering members comprise dishes $a$ and $b$ placed one above the other in such manner that the liquid or fluid to be purified can penetrate to the interior of the chamber formed by the juxtaposition of the dishes through apertures $c$, Fig. 3. The two dishes $a$ and $b$ are connected by means of a neck or collar $d$ on the lower dish of each pair which extends into a central aperture $e$ in the upper dish of the next succeeding pair.

Any number of filtering members threaded upon a rod $f$ of star-shaped cross section may form a battery which is received within a cylindrical receptacle $g$. This receptacle is provided at its lower part with a pocket $h$ having an inlet $i$ for the entrance of the liquid to be purified, and having attached to it a valve chamber $j$ with a screw-down valve and wheel $k$ and discharge pipe $l$. At its upper part said cylindrical receptacle is fitted with a sleeve $m$ having a shoulder $n$ between which and a nut $p$ on rod $f$ a retracting spring $o$ is confined, the rod $f$ being screw-threaded as at $f^1$ to afford means for adjusting the proximity to one another of successive filtering chambers.

A neck $q$ to which the receiver $r$ of the filtered liquid is attached is mounted above sleeve $m$, and a tap $s$ for drawing off the liquid is secured to said neck $q$. The receiver is provided at top with means for the admission of air consisting of a hollow stopper $t$ containing cotton wool $u$ soaked in a sterilizing agent. The liquid entering through inlet $i$ passes through valve chamber $j$ and apertures $h^1$ and finds its way into the lower filtering chambers throwing off its impurities, and then rises and passes through the chambers above, which it reaches by way of the grooves $f^2$ on rod $f$. Thence it passes through orifices $n^1$ into the receiver $r$ whence it may be drawn off by means of tap $s$.

When the apparatus requires cleansing, the inlet $i$ is closed by valve $v$, which latter at same time opens the discharge orifice $l$. The purified liquid in the receiver then exerts pressure from within the purifying chambers in proportion to its height tending to separate the chambers and to expand spring $o$ so that the purified water flows downwards carrying with it through pipe $l$ all the impurities deposited on the surfaces of the dishes and on the other parts of the apparatus.

The purifying members shown in the drawings at Fig. 8 are annular and their function is identical with that of the members described above, but the flow of liquid is greater.

By interposing a suitable disk between each pair of dishes the flow of the liquid is increased.

In Fig. 9, each filtering element comprises two concentric elastic rings, and each of these rings is composed of an upper concave section $a$ and a lower concave section $b$, connected by tubular necks.

In Fig. 10 I employ disks 1 having at their inner and outer edges feet or projections by means of which one disk rests on the one below; the disks are superposed or stacked around a central vertical pipe 2 which is perforated and serves as a conduit for the purified liquid.

In Fig. 11 I have shown two concentric series of disks 3, 3' of the same character as those of Fig. 10; the inner disks 3 engage the discharge pipe, the outer ones 3' are larger so as to leave a space between their inner disk and the outer disk of each layer or tier.

In the construction illustrated by Fig. 12, the disks 4, instead of having downward projections at their inner and outer edges, are provided with flanges projecting upwardly and downwardly at their outer edges, the upward flange of one disk being in contact with the downward flange of the next disk above.

In Fig. 13, inner disks 6 of the same construction as shown in Fig. 12, are combined with an outer set of disks or rings 6' having upward and downward flanges both at their inner and at their outer edges.

In each of the constructions represented in Figs. 10 to 13 inclusive, springs are interposed between adjacent disks or rings so that when the nut at the end of the series is loosened, adjacent disks will be forced apart by the springs located between them, so as to allow the filter to be cleaned by passing a clean liquid therethrough in the direction opposite to that of the flow during filtration. These springs are designated as 5 in Figs. 10 and 11, and as 5' in Figs. 12 and 13.

In Fig. 14 the disks have a number of small tongues $f$ serving as springs and produced by stamping up the metal, the disks being further provided below with flanges as shown.

Claim:

1. A filter comprising a series of filtering members held together yieldingly so that they may move apart slightly when the flow of the fluid is reversed to clean the filter.

2. A filter comprising a series of filter elements and elastic means for normally pressing said elements together.

3. A filter comprising a series of filtering members engaging each other at their adjacent surfaces, springs interposed between said members and having a tendency to force them apart, and means for pressing said members into firm contact with each other.

The foregoing specification of my improvements in apparatus for filtering liquids and fluids signed by me this 26th day of December 1905.

EMILE GOBBI.

Witnesses:
MAURICE H. PIGNET,
HANSON C. COXE.